United States Patent [19]

Noji et al.

[11] Patent Number: 5,011,288

[45] Date of Patent: Apr. 30, 1991

[54] POSITION CONTROL SYSTEM FOR UNMANNED AUTOMATED VEHICLE

[75] Inventors: Akio Noji; Kenji Kamimura; Sadachika Tsuzuki, all of Saitama, Japan

[73] Assignee: Honda Giken Kogyo Kabushiki Kaisha, Tokyo, Japan

[21] Appl. No.: 344,574

[22] Filed: Apr. 28, 1989

[30] Foreign Application Priority Data

May 13, 1988 [JP] Japan .................................. 63-116689

[51] Int. Cl.$^5$ ........................ G01B 11/14; B60T 7/16; G08G 1/123
[52] U.S. Cl. ................................... 356/375; 180/169; 340/988
[58] Field of Search ....................... 356/375, 373, 152; 340/988, 989, 990; 180/169

[56] References Cited

U.S. PATENT DOCUMENTS

| | | | |
|---|---|---|---|
| 3,687,556 | 8/1972 | Price et al. ........................... | 356/152 |
| 4,099,591 | 7/1978 | Carr .................................... | 340/988 |
| 4,305,077 | 12/1981 | Tsumura ............................ | 343/112 R |
| 4,309,758 | 1/1982 | Halsall et al. ...................... | 364/424 |
| 4,647,784 | 3/1987 | Stephens ............................. | 356/1 |
| 4,700,301 | 10/1987 | Dyke .................................. | 364/423 |
| 4,713,767 | 12/1987 | Sato et al. .......................... | 340/988 |
| 4,796,198 | 1/1989 | Boultinghouse et al. ........... | 180/169 |
| 4,817,000 | 3/1989 | Eberhardt ........................... | 364/443 |
| 4,862,392 | 8/1989 | Steiner ................................ | 340/747 |

FOREIGN PATENT DOCUMENTS

0185816 7/1986 European Pat. Off. .
8201420 4/1982 PCT Int'l Appl. .

Primary Examiner—F. L. Evans
Assistant Examiner—K. P. Hantis
Attorney, Agent, or Firm—Pollock, VandeSande and Priddy

[57] ABSTRACT

A position control system for a moving vehicle comprising a light beam source for scanning a light beam in all the different azimuthal directions around the moving vehicle; a beam receiver mounted on the moving vehicle and receiving light reflected from a plurality of light-reflectors; a detector for detecting each distance between the moving vehicle and each of the light-reflectors; a detector for detecting differential azimuths between the adjoining two light-reflectors; and a calculator for calculating coordinates of the respective light-relectors on a coordinate system wherein a position of the moving vehicle is fixed as the origin.

4 Claims, 5 Drawing Sheets

POSITION CONTROL SYSTEM FOR UNMANNED AUTOMATED VEHICLE

BACKGROUND OF THE INVENTION

1. Field of the Invention

The present invention relates to a position control system for an unmanned automated vehicle (hereinafter referred to simply as "moving vehicle"), and more particularly to a position control system for a moving automobile, a moving mobile carrying device in a factory, or a moving vehicle for use in agriculture, civil engineering machinery and the like.

2. Description of the Prior Art

Heretofore, as a system for detecting the present position of a moving vehicle as described above, there has been provided a self-position detecting system constructed in such manner that an electric wave transmitted from transmitting sources located at a plurality of places is received by a receiver mounted on the moving vehicle, and the position of the moving vehicle is calculated by means of a direction or an azimuth of reception of the electric wave.

In such a self-position detecting system as described above, a plurality of transmitters for generating electric waves are required, so that there is the disadvantage that the whole system becomes expensive.

As a countermeasure, a system is described in, for example, Japanese Patent Laid-open No. 674766/1984 for detecting a self-position of a moving body by scanning a light beam emitted from the moving body in the circumferential direction centering around the moving body. In this system, light-reflecting means for reflecting the light beam in precisely the same direction as the incident light are secured at at least three positions apart from the moving body, and the moving body is provided with a beam source means, a light beam scanning means for scanning light beam emitted from the beam source means, and a beam receiving means for receiving light reflected from the light-reflecting means.

In the above system, differential azimuths between adjoining two light-reflecting means centering around the moving body are detected on the basis of received light output of the beam-receiving means, whereby a self-position of the moving body is calculated based on the detected angles and positional information of the light-reflecting means which have been previously set.

In the above described arrangement, however, positional information of the light-reflecting means must have been previously set, and the whole system is significantly affected adversely by even a slight error in the preset positional information of the light-reflecting means. Hence, for example, in agricultural work and the like, it becomes necessary for such operations that the positions of and positional information of the light-reflecting means, i.e., distances between two of the light-reflecting means and the differential azimuths between three light-reflecting means, must be previously set accurately prior to the work every time there is a change in the field working area, and the positional information obtained during these presetting operation must be input to the control means of the system. Accordingly, accurate measurement of the distances and relative angles of the light-reflecting means disposed in a wide working area, as well as the inputting operation therefor, are extremely complicated operations.

SUMMARY OF THE INVENTION

An object of the present invention is to solve the above described problems of the prior art and to provide a position control system for an automated vehicle in which the moving vehicle or a moving body calculates its own position by only disposing suitably light-reflecting means in a moving region of the moving body, whereby a traveling direction of the moving body can be controlled.

In order to solve the above described problems, the present invention is characterized, in a position control system for an unmanned moving vehicle which detects a position of the moving vehicle by scanning a light beam emitted from the moving vehicle in all the different azimuthal directions around the moving vehicle, by the provision of light-reflecting means disposed at at least three positions apart from the moving vehicle and reflecting light in the direction of incident light; a light beam source means mounted on the moving vehicle and emitting the light beam; a light beam scanning means mounted on the moving vehicle and scanning the light beam in all the differential azimuthal directions around the moving vehicle; a beam receiver means mounted on the moving vehicle and receiving light reflected from the light-reflecting means; a means for detecting each distance between the moving vehicle and each of the light-reflecting means on the basis of received light output of the beam receiver means; a means for detecting differential azimuths between the adjoining two light-reflecting means; and a means for calculating coordinates of the respective light-reflecting means on the basis of the distance and the differential azimuths on a primitive coordinate system, wherein a position of the moving vehicle is fixed as the origin.

In the present invention having the above described construction, since the relative position between the moving vehicle and the light-reflecting means can be detected on the basis of distances between the moving vehicle and the light-reflecting means as well the differential azimuths between each adjoining pair of light-reflecting means centering around the moving vehicle, even if positions of the light-reflecting means are not accurately measured every time the light-reflecting means are set in position adjacent a working area, and the results obtained are not inputted to the control system, the position of the moving vehicle can still be detected, and control for steering of the vehicle can be effected on the basis of the detected results.

DETAILED DESCRIPTION OF THE PREFERRED EMBODIMENTS

Figure 7:
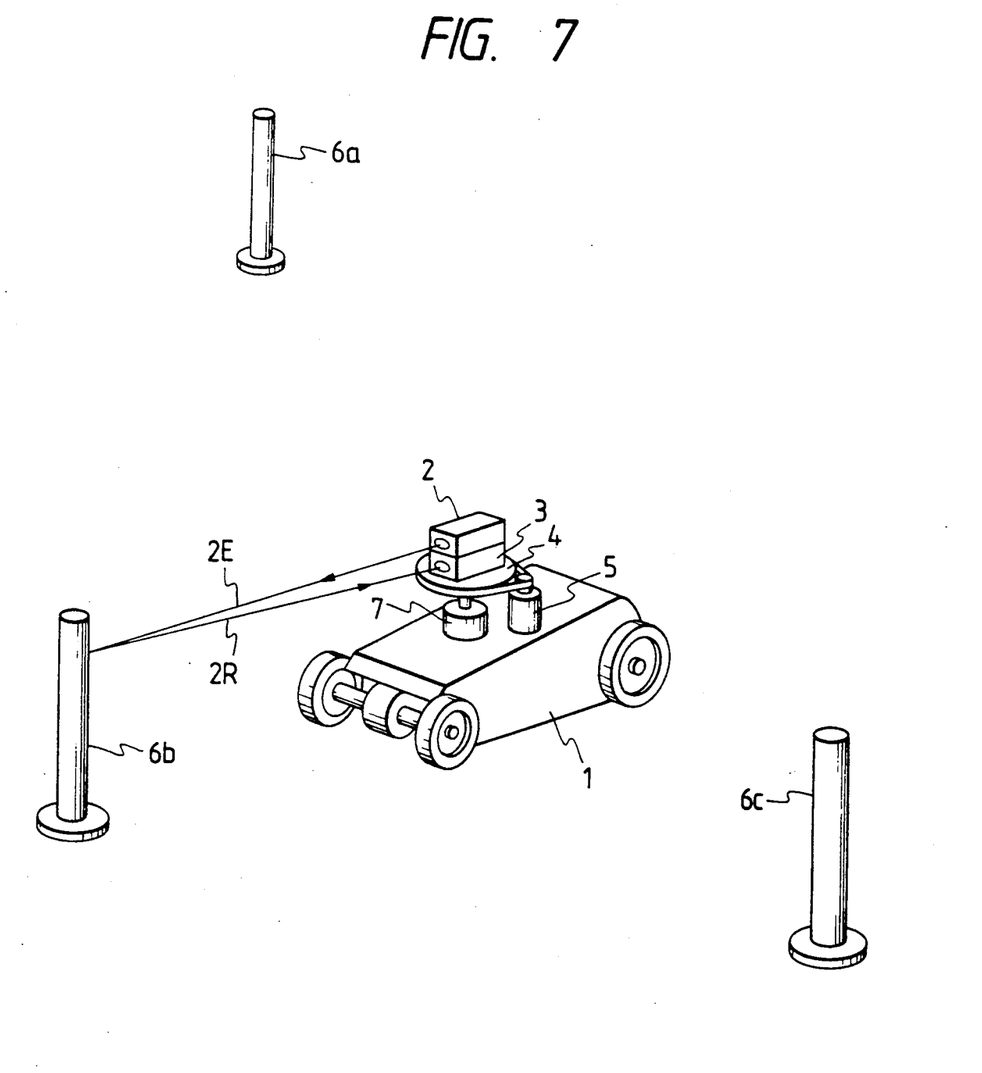
FIG. 7 is a perspective view showing a relative positional relationship between a moving vehicle and each of reflectors.

An embodiment of the present invention will be described hereinbelow by referring to the accompanying drawings. FIG. 7 is a perspective view showing a state of arrangement in respect of a moving vehicle carrying the control system according to the present invention and each of several light reflectors disposed in an area in which the moving vehicle travels.

In FIG. 7, the moving vehicle 1 is one for use in an agricultural application such as a lawn mower and the like. A rotating table 4 driven by a motor 5 is mounted on the upper part of the moving vehicle 1. The rotating table 4 mounts a beam source 2 for emitting light beam 2E and a beam receiver 3 for receiving a light beam 2R reflected by each of the reflectors 6a–6c. The beam source 2 is provided with a light beam emitting means (light-emitting diode) and the beam receiver 3 is provided with a means for receiving incident light to convert it into an electrical signal (photo-diode) (both of them are not shown). Furthermore a rotary encoder 7 is disposed so as to be interlocked with a drive shaft of the rotating table 4, so that when pulses output from the rotary encoder 7 are counted, a turning angle of the rotating table 4 can be detected.

The reflectors 6a–6c are located around a working area of the moving vehicle 1. Each of the reflectors 6a–6c has a reflection surface reflecting incident light in the incident direction and for this purpose, a so-called corner cube prism which has been conventionally available on the market and the like may be used.

Figure 1:
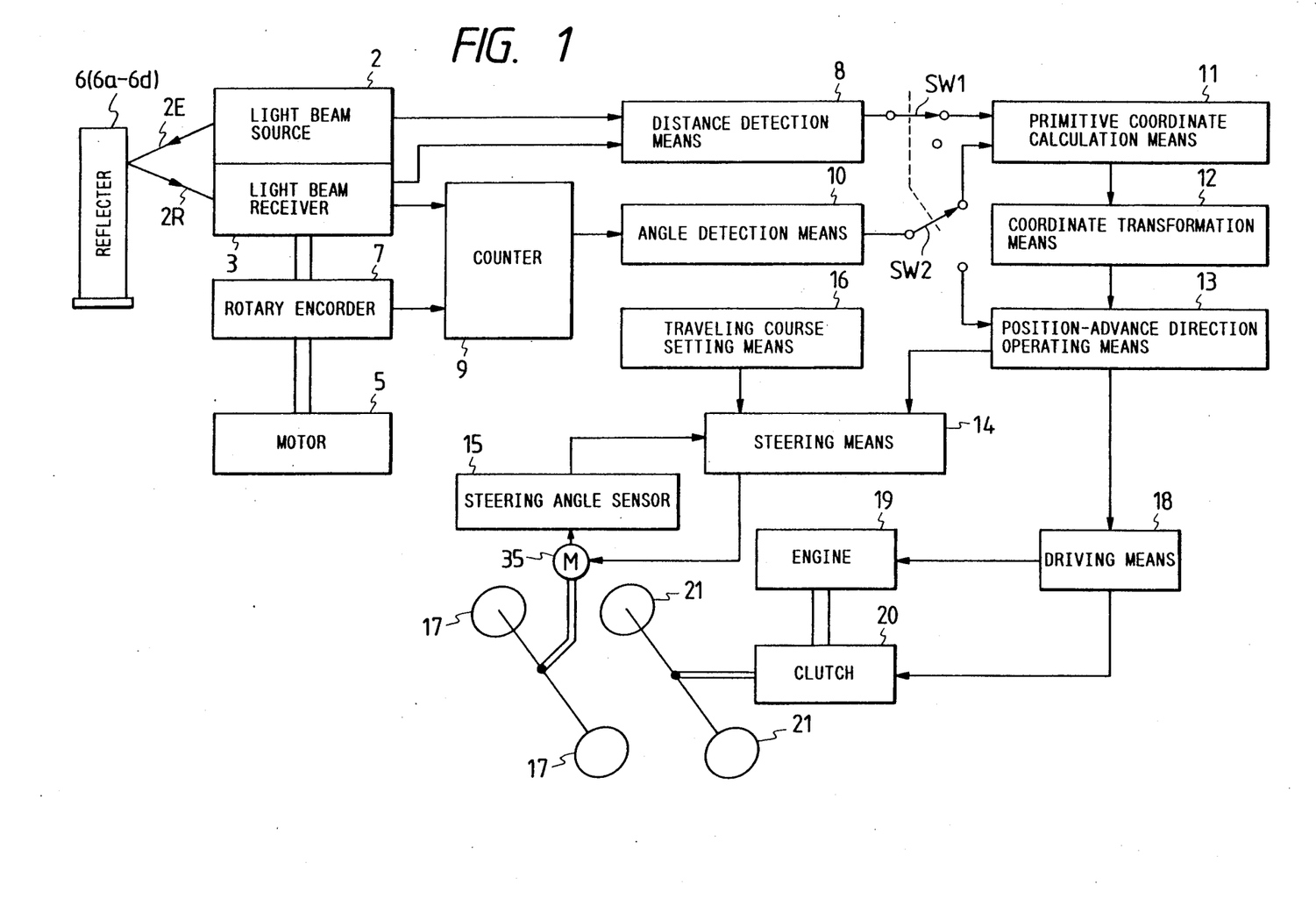
FIG. 1 is a block diagram illustrating an embodiment of the present invention.

Next, the construction of the control system in the present embodiment will be described in accordance with the block diagram of FIG. 1 wherein the light beam 2E emitted from the beam source 2 is scanned in a rotating direction of the rotating table 4 and the light beam 2E is reflected by one of the reflectors 6a–6c. The light beam 2R reflected by the one of the reflectors 6a–6c is introduced into the beam receiver 3. In a distance detection means 8, the distance between the moving vehicle 1 and any one of the reflectors 6a–6c is calculated in a suitable manner based on a difference between a phase of the light beam projected from the beam source 2 and that of the reflected light returning to the beam receiver 3.

In a counter 9, the number of pulses output from the rotary encoder 7 is counted in accordance with rotation of the rotating table 4. The value counted of the pulses is transferred to an angle detection means 10 whenever reflected light is received by the beam receiver 3. In the angle detection means 10, each angle defined between the adjoining two reflectors 6a–6c, respectively, viewed from the moving vehicle 1, i.e., the differential azimuth is calculated on the basis of the counted value of the pulses transferred upon every reception of the reflected light beam.

In a primitive coordinate calculation means 11, coordinates of the reflectors 6 in a coordinate system which is defined by adopting the moving vehicle 1 as the origin (hereinafter referred to as "primitive coordinate system" in the present specification) are obtained from the results of the calculation of the distance as well as the differential azimuths in the distance detection means 8 and the angle detection means 10. In a coordinate transformation means 12, the coordinate is transformed to a system of coordinates in which any one of the plural reflectors 6a–6c is defined as the origin (hereinafter referred to as "execution coordinate system" in the present specification) on the basis of a value of coordinates calculated in the primitive coordinate calculation means 11.

In a position-advance direction operating means 13, coordinates and an advance direction of the moving vehicle 1 are operated, and the results operated are inputted to a steering means 14. In the steering means 14, the operated results sent from the position-advance direction operating means 13 are compared with a traveling course which has been preset at a traveling course setting means 16, and a steering motor (M) 35 connected to front wheels 17 of the moving vehicle is driven on the basis of the above-mentioned comparative results. An angle of steering for the front wheels 17 driven by the steering motor 35 is detected by means of a steering angle sensor 15 mounted on the front wheels of the moving vehicle 1, and the value detected is fed back to the steering means 14.

A driving means 18 controls starting and stopping of an engine 19 as well as operation of a clutch 20 for transmitting the power of the engine 19 to rear wheels 21.

Switches SW1 and SW2 are switched in an interlocking manner. After the calculation of an execution coordinate system has been performed, a position of the moving vehicle 1 on the execution coordinate system is calculated only based on the information of the differential azimuth from the angle detection means 10.

Figure 2:
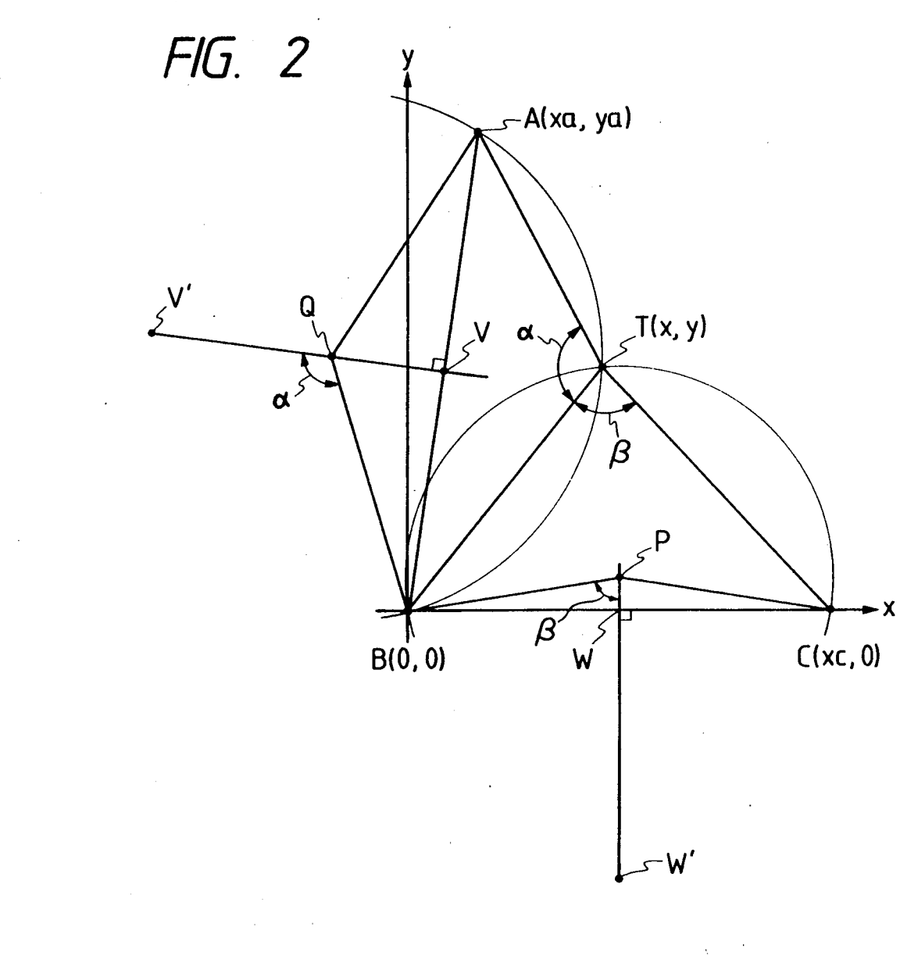
FIG. 2 is an explanatory diagram for explaining the principle of detecting a position of the moving vehicle used in the present invention.
Figure 3:
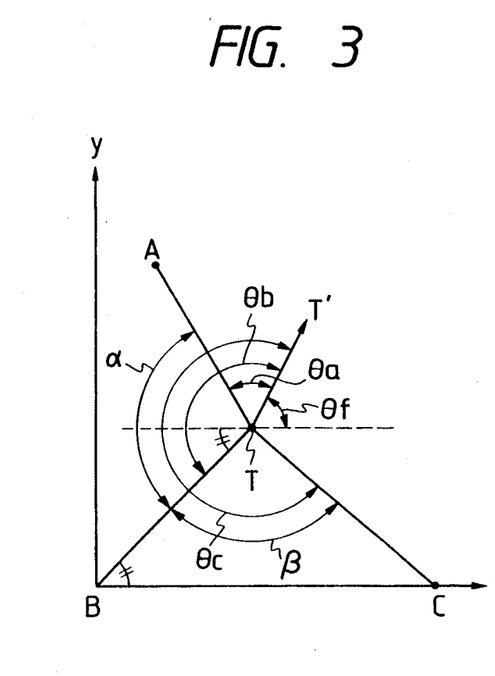
FIG. 3 is an explanatory diagram for explaining the principle of detecting a forward direction of the automated vehicle used in the present invention.

In accordance with the present embodiment having the above described construction, an essential principle for detecting a position and a forward direction of the moving vehicle 1 will be described hereinbelow. In FIGS. 2 and 3, positions of the moving vehicle 1 and the reflectors 6a–6c are shown, respectively, on the execution coordinate system obtained by subjecting a primitive coordinate system wherein the moving vehicle 1 is defined as the origin, to coordinate transformation in accordance with the undermentioned procedure. In these Figures, the positions of the reflectors 6a–6c are represented by reference characters A, B and C, respectively. The moving vehicle 1 resides at point T, and the positions of reflectors 6a–6c located in a working area of the moving vehicle 1 are indicated by an x - y coordinate or execution coordinate system wherein the position B of the reflector 6b is defined as the origin, and a line extending through the reflectors 6b and 6c is fixed as x-axis.

As is apparent from FIG. 2, the position T of the moving vehicle is present on a circumscribed circle for a triangle ATB as well as a circumscribed circle for a triangle BTC. Accordingly, when two points of intersection of the circumscribed circles Q and P for the triangles ATB and BTC are calculated, the position of the moving vehicle 1 is fixed. In this case, since the reflector 6b is the origin, the other intersection T of the circumscribed circles P and Q is calculated in accordance with the following procedure so that a position of the moving vehicle 1 is found.

First, if the center of the circumscribed circle P for the triangle BTC is represented by P, the center P resides on a perpendicular bisector of a segment of the line BC, and it gives the following equation, $$<BPW'=\beta$$

where W' is a point on the perpendicular bisector of the segment BC and which resides on the side opposite to the point T with respect to the straight line BC and is sufficiently apart from the straight line, from a relationship between the central angle and the angle of circumference $\beta$.

Observing a triangle BPW (W is midpoint of the segment BC), coordinates of the center of the circle P and a radius thereof are $\{xc/2, (xc/2) \cot \beta\}$ and $|xc/(2 \sin \beta)|$, respectively. Hence, the circumscribed circle P is represented by the following equation.

$$(x-xc/2)^2 + \{y-(xc/2) \cot \beta\}^2 = \{xc/(2 \sin \beta)\}^2$$

When the equation is rearranged, the following equation (1) is obtained.

$$x^2 - xc.x + y^2 - xc.y.\cot \beta = 0 \qquad (1)$$

When the center of the circumscribed circle Q for the triangle ATB is fixed as Q, the center Q resides on a perpendicular bisector of a segment of the line AB, and it gives the following equation, $$<BQV' = \alpha$$

where V' is a point on the perpendicular bisector of the segment AB and which resides on the side opposite to the point T with respect to the straight line AB and is sufficiently apart from the straight line.

Observing a triangle BQV (V is midpoint of the segment AB), coordinates of the center of the circle Q and a radius thereof are $\{xa/2 + (ya/2) \cot \alpha, ya/2 - (xa/2) \cot \alpha\}$ and $$|\sqrt{xa^2 + ya^2} / (2 \sin \alpha)|,$$

respectively. Hence, the circumscribed circle Q is represented by the following equation (2).

$$x^2 - x(xa + ya.\cot \alpha) + y^2 - y(ya - xa.\cot \alpha) = 0 \qquad (2)$$

From the above equations (1) and (2), coordinates (x, y) of the point T are calculated from the following equations (3) and (4).

$$x = xc(1 + k.\cot \beta)/(1 + k^2) \qquad (3)$$

$$y = kx \qquad (4)$$

where k is represented by an equation (5):

$$k = (xc - xa - ya.\cot \beta)/(ya - xa.\cot \beta - xc.\cot \beta) \qquad (5)$$

and which indicates an inclination of a straight line BT.

Furthermore, an advance direction of the moving vehicle 1 is calculated as follows. In FIG. 3, assuming that an angle defined by the advance direction TT' of the moving vehicle 1 and x-axis is $\theta f$, and angles of rotation defined by the respective reflectors 6a, 6b and 6c (points A, B and C, respectively) with respect to the advance direction as reference are $\theta a$, $\theta b$, and $\theta c$, since the inclination of the segment BT is k, it gives the following equation, $$\theta f = 180° - (\theta b - \tan^{-1} k) \qquad (6)$$

Figure 4:
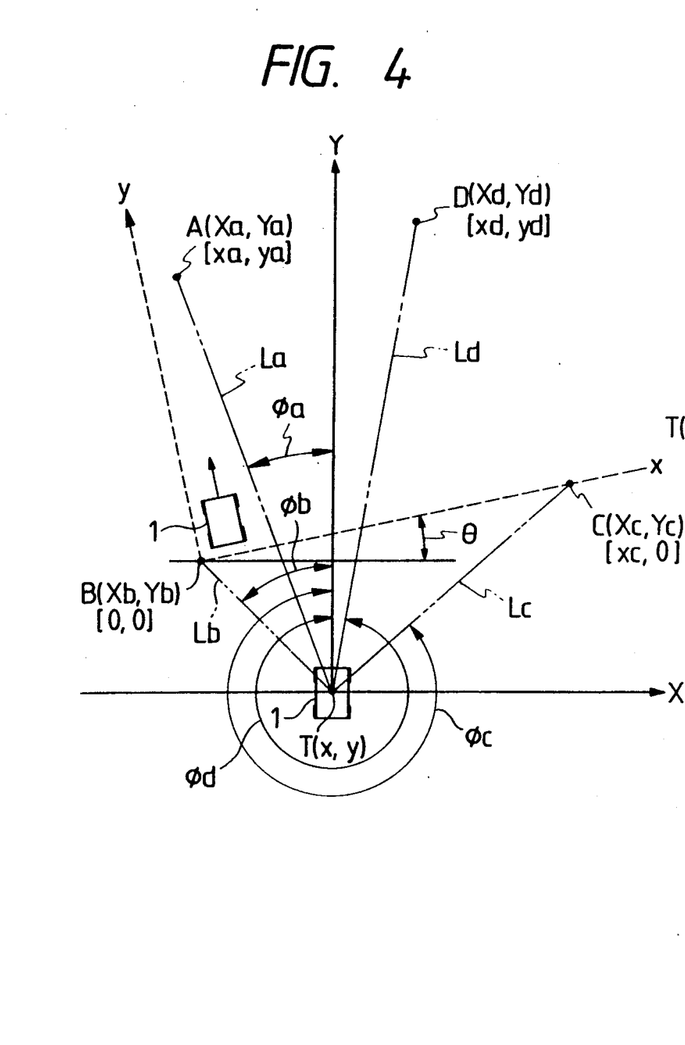
FIG. 4 is an explanatory diagram for explaining a method for determining a coordinate system.

Next, a procedure for determining a system of execution coordinates in order to indicate each of relative positions between the moving vehicle 1 and the reflectors 6 will be described herein. FIG. 4 is a layout drawing for the moving vehicle 1 and the reflectors 6 which illustrates an example wherein four reflectors 6a–6d are located at four points A, B, C and D, respectively. The reflectors 6a–6d are placed in a working area for the moving vehicle 1 so as to form a quadrilateral by connecting the four points in turn. The moving vehicle 1 positions at an arbitrary point T and stands ready for working. X- and Y-axes are axes of coordinates for a primitive coordinate system in which the origin of the X- and Y-axes is point T, and the X- and Y-axes may be set arbitrarily.

In the above arrangement, distances La–Ld determined by the point T and the respective reflectors 6a–6d are first measured by means of the distance detection means 8, and then angles of rotation $\phi a$–$\phi d$ defined by the respective reflectors 6a–6d with respect to Y-axis as the reference are measured by the angle detection means 10.

In the coordinate calculation means 11, coordinates of the respective reflectors 6a–6d in the X - Y coordinate system, wherein the point T is the origin, are calculated on the basis of the distances La–Ld as well as the angles of rotation $\phi a$–$\phi d$ in accordance with the following equations.

Reflector 6a ... $Xa = -La \cdot \sin \phi a$
$Ya = La \cdot \cos \phi a$

Reflector 6b ... $Xb = -Lb \cdot \sin \phi b$
$Yb = Lb \cdot \cos \phi b$

Reflector 6c ... $Xc = -Lc \cdot \sin \phi c$
$Yc = Lc \cdot \cos \phi c$

Reflector 6d ... $Xd = -Ld \cdot \sin \phi d$
$Yd = Ld \cdot \cos \phi d$

After calculating the coordinates of the respective reflectors 6a–6d in the X - Y coordinate system (primitive coordinate system) in accordance with the above equations, the coordinate axes are rotated by an angle $\theta$ and subjected to parallel displacement to transform them into an execution coordinate system wherein any one of the reflectors 6a–6d is defined as the origin. In the present embodiment, the reflector 6b is fixed as the origin and x-axis passes through the reflector 6c.

In such an x - y coordinate system (execution coordinate system) wherein the reflector 6b is fixed as the origin, coordinates of the respective reflectors 6a–6d are calculated in accordance with the following equations.

Reflector 6a ... $xa = (Xa - Xb) \cos \theta + (Ya - Yb) \sin \theta$
$ya = -(Xa - Xb) \sin \theta + (Ya - Yb) \cos \theta$ Reflector 6b ... $xb = 0$
$yb = 0$ Reflector 6c ... $xc = (Xc - Xb) \cos \theta + (Yc - Yb) \sin \theta$
$yc = 0$ -continued Reflector 6d ... $xd = (Xd - Xc) \cos \theta + (Yd - Yc) \sin \theta$
$yd = -(Xd - Xc) \sin \theta + (Yd - Yc) \cos \theta$ $$\theta = \tan^{-1}\left(\frac{Yc - Yb}{Xc - Xb}\right)$$

In accordance with the above equations (3)–(5), position coordinates (x, y) of the moving vehicle 1 are calculated from the coordinate values of the reflectors 6a–6d. Further, an advance direction of the moving vehicle 1 is calculated in accordance with the equation (6).

Since FIG. 4 shows an example wherein the reflectors are placed at four positions, a position and an advance direction of the moving vehicle 1 are detected on the basis of a relative position between any three reflectors among four of them and the moving vehicle 1.

Namely, parameters for measurement precision corresponding to relative positions between the respective reflectors 6a–6d and the moving vehicle 1 have been previously determined, and the respective relative positions between the reflectors 6a–6d and the moving vehicle 1 are compared with each other, whereby three reflectors are selected so as to obtain results for measuring the positions with better precision.

In this case, it is clear that the above equations (3)–(5) must be modified so as to correspond to the reflectors 6 selected.

Since $\phi a$–$\phi d$ shown in FIG. 4 are angles of rotation extending from the reference Y-axis to the reflectors, in the case where a position and an advance direction of the moving vehicle are calculated in accordance with the formulae for calculation (3)–(5), the operation must be effected by transforming the angles of rotation into the differential azimuths $\alpha$ and $\beta$ (see FIGS. 2 and 3) of the respective reflectors viewed from the moving vehicle.

Figure 5:
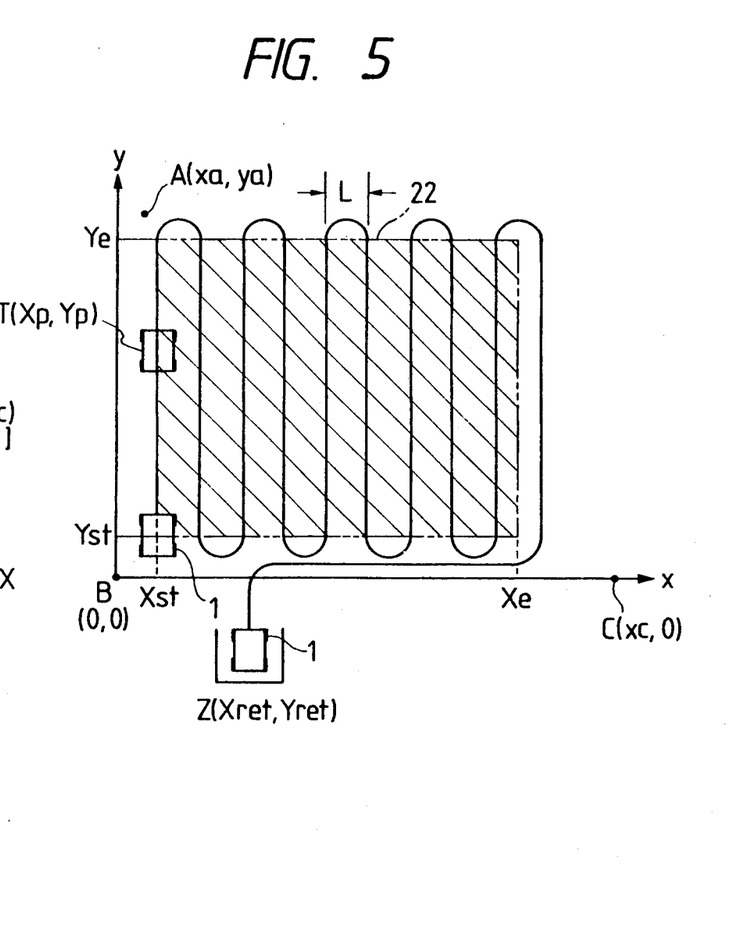
FIG. 5 is a schematic diagram showing a state of arrangement in respect of a traveling course of a moving vehicle and reflectors.
Figure 6:
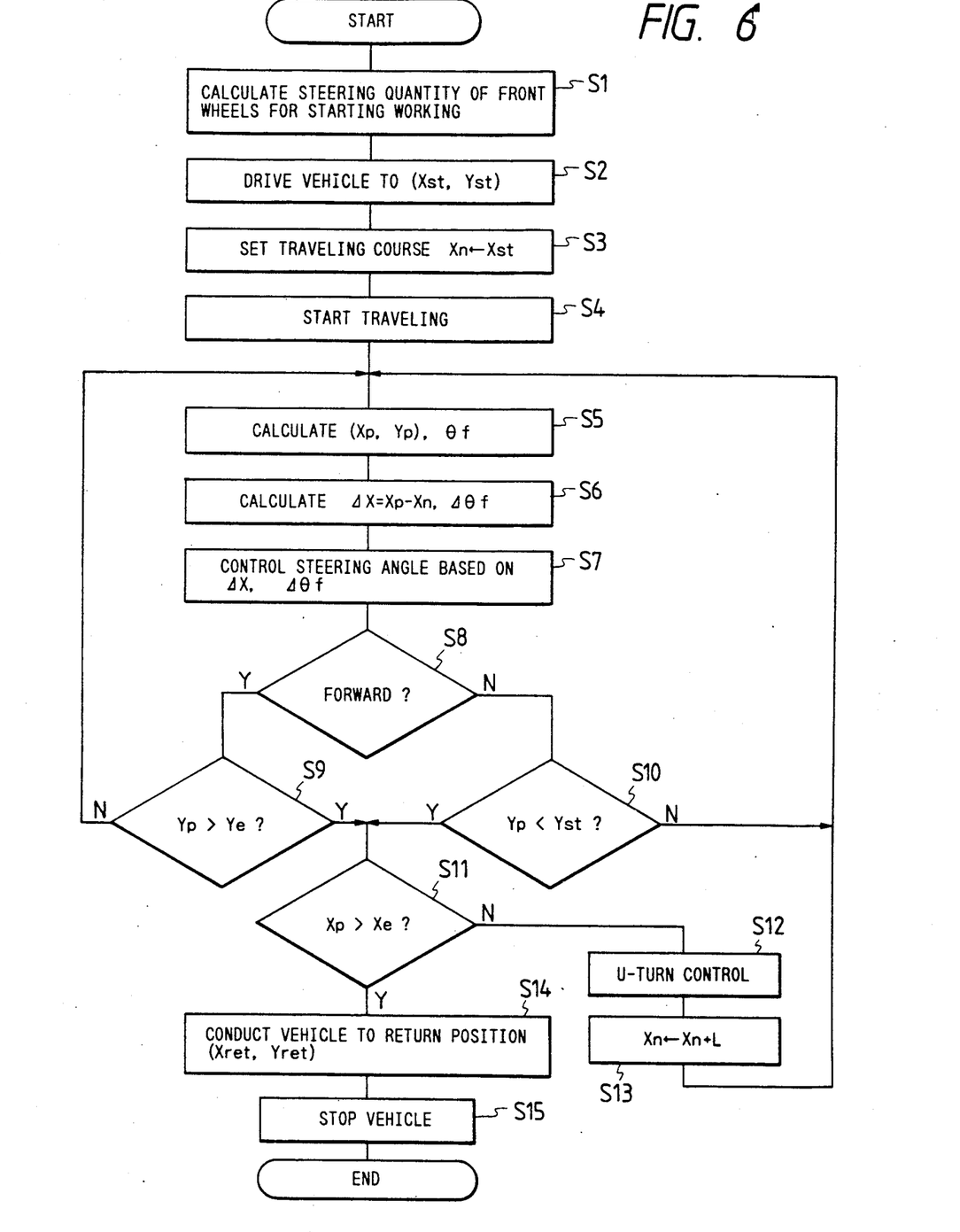
FIG. 6 is a flowchart showing a procedure for steering control.

Next, steering control for the moving vehicle 1 based on positional information of the moving vehicle 1 calculated in accordance with the above procedure will be described hereinbelow. FIG. 5 is a schematic diagram showing a state of arrangement in respect of a traveling course of the moving vehicle 1 and reflectors 6, and FIG. 6 is a flowchart illustrating a procedure for steering control.

In FIG. 5, points A, B and C indicate positions at which the reflectors 6a–6c are disposed, and a position and a working area 22 of the moving vehicle 1 are represented by an execution coordinate system wherein the point B is fixed as the origin, and a straight line extending between the points B and C is defined as x-axis. (Xret, Yret) indicate coordinates of a returning position Z of the moving vehicle 1, and the working area 22 is a quadrilateral region including four apexes of the points represented by four coordinates (Xst, Yst), (Xst, Ye), (Xe, Yst) and (Xe, Ye). In this case, the current position of the moving vehicle 1 is represented by T(Xp, Yp).

For the simple explanation, while such an example wherein four sides of the working area 22 are parallel to x- or y-axes is shown in FIG. 5, another direction and/or shape of the working area may be selected so far as the points A–C are disposed around the working area 22.

In accordance with the flowchart shown in FIG. 6, a control procedure will be described hereinbelow in which it is assumed that the moving vehicle 1 reciprocates in parallel to y-axis as in the traveling locus of FIG. 5, and the pitch therefor is L.

In step S1, a steering amount of the front wheels of the automated vehicle 1 is calculated in the steering means 14 on the basis of both coordinates of the current position (Xret, Yret) of the moving vehicle 1 obtained in the position-advance direction operating means 13 and of a working start position (Xst, Yst) set in the traveling course setting means 16.

In step S2, the motor 35 is driven by means of the steering means 14 to steer the front wheels 17 along the direction determined by the aforesaid steering amount, and the engine is started by the driving means 18. Then, the clutch is engaged to drive the moving vehicle 1 and it is positioned at the working start position (Xst, Yst).

In step S3, Xst is set as an X-coordinate of the traveling course Xn so that the traveling course is decided.

When starting the travel of the moving vehicle 1 in step S4, the moving vehicle 1 operates the present position (Xp, Yp) and an advance direction $\theta f$ thereof in step S5.

In step S6, a deviation amount of the traveling course ($\Delta X = Xp - Xn$, $\Delta \theta f$) is operated, and a steering angle is controlled by the steering means in response to the amount of deviation calculated in step S7.

In step S8, it is judged that either the moving vehicle 1 travels towards the direction going away from the origin (forward direction) or the direction approaching the origin (reverse direction) in the y-axial direction.

In the case of forward direction, it is judged whether one stroke is finished (Yp > Ye) or not in step S9, while in the case of reverse direction, it is judged whether one stroke is finished (Yp < Yst) or not in step S10. When it is judged that such one stroke is not finished in either step S9 or step S10, processings in steps S5–S8 are repeated.

In the case where it is judged that such one stroke is finished in either step S9 or S10, it is judged in the following step S11 whether all of the strokes are finished (Xp > Xe) or not.

When all the strokes are not finished, the procedure shifts from step S11 to step S12 to effect U-turn control of the automated vehicle 1.

In step S13, a pitch L is added to Xn thereby operating (Xn + L) and as a result, the following traveling course is set. When the following traveling course is set, the procedure returns to step S5 and the above described processings are repeated.

When all the strokes are completed, the moving vehicle returns to the return position (Xret, Yret) in step S14, and the travel thereof stops in step S15.

The U-turn control in step S12 does not rely upon the processings of steps S5–S7 wherein the positional information of the moving vehicle 1 operated in the position-advance direction operating means 13 is fed back to the steering means 14, but is effected in accordance with any suitable known program which has been previously set. In other words, control for steering of the moving vehicle is carried out in accordance with feedback control inside the working area 22, while control for turning a traveling direction of the moving vehicle is effected according to program control.

In the above embodiment, the coordinates of the working start position (Xst, Yst) with respect to the origin B (O, O) have been previously set in the traveling course setting means 16. It is, however, also possible that the moving vehicle 1 is conducted to an arbitrary position in a suitable manner such as radio guidance or the like, which position is defined as by a working start position (Xst, Yst), and then travel of the moving vehicle is started from said position.

As described above, according to the present embodiment, a distance between the moving vehicle 1 and the respective reflectors 6 is detected in a suitable manner such as by detection of a phase difference between emitted and received light beams, besides and each differential azimuth between the respective reflectors 6 centering around the moving vehicle 1 is detected on the basis of azimuth angles of light beams from the reflectors, whereby coordinate values of the respective reflectors 6 in a primitive coordinate system wherein a position of the moving vehicle 1 is defined as the origin are calculated.

Then, the primitive coordinate system is transformed into an execution coordinate system in which any one of the reflectors 6 is fixed as the origin, and the present position as well as an advance direction of the moving vehicle 1 are calculated on the basis of the coordinate values of the reflectors 6 in the execution coordinate system.

As a result, even if positions of the respective reflectors or distances therebetween placed in a working area have not been previously known, a relative position between the moving vehicle 1 and the reflectors 6 can be detected, and steering of the moving vehicle 1 can be controlled on the basis of the results detected.

As is apparent from the above description, even in the case when reflectors must be rearranged because an area where a working by a moving vehicle is required is changed, it is sufficient to only dispose suitably the reflectors around a new working area in accordance with the present invention. Accordingly, unlike prior art, a complicated procedure in which a setting position is accurately measured for every setting occasion of reflectors, the results are inputted and set to a control system, and then working by a moving vehicle is started, becomes unnecessary in the present invention, so that its working efficiency can be remarkably elevated.

What is claimed is:

1. A position control system for a moving vehicle comprising;

light-reflecting means disposed at at least three positions apart from the moving vehicle and reflecting light in the direction of incident light;

light beam source means mounted on the moving vehicle for emitting a light beam;

light beam scanning means mounted on the moving vehicle for scanning the light beam in all the different azimuthal directions around the moving vehicle;

beam receiver means mounted on the moving vehicle for receiving beams of light reflected from the light-reflecting means;

distance detection means on said vehicle for detecting each distance between the moving vehicle and each of the light-reflecting means on the basis of the output of the beam receiver means;

angle detection means on said vehicle for detecting differential azimuths between two adjoining light-reflecting means on the basis of the output of the beam receiver means;

first calculating means on said vehicle for calculating the positions of the respective light-reflecting means on the basis of said detected distances and said detected differential azimuths, said calculation being on a primitive coordinate system wherein the position of the moving vehicle is fixed as the origin;

coordinate transformation means coupled to said first calculating means for transforming said primitive coordinate system to an execution coordinate system wherein the calculated position of one of the light-reflecting means is defined as the origin; and second calculating means coupled to said coordinate transformation means and to said angle detection means for calculating the position of the moving vehicle on said execution coordinate system by use of triangular techniques employing detected differential azimuths provided by said angle detection means and the positions of said light reflecting means calculated by said first calculating means.

2. A position control system for a moving vehicle as claimed in claim 1 wherein the coordinate transformation is effected in such a manner that one of the reflecting means is fixed as the origin, and a straight line passing through the origin and one of the remaining reflecting means is defined as either of the coordinate axes.

3. A position control system for a moving vehicle as claimed in claim 1 wherein the calculated positions of the light-reflecting means constitute the coordinates of the respective light-reflecting means.

4. The position control system of claim 1 including switching means operative to initially supply said detected distances and said detected differential azimuths to only said first calculating means for use by said first calculating means to calculate the positions of said light-reflecting means on said primitive coordinate system, said switching means being operative subsequent to operation of said coordinate transformation means to supply said detected differential azimuths to only said second calculating means for use by said second calculating means to calculate the position of said moving vehicle on said execution coordinate system.

* * * * *